Patented Apr. 29, 1952

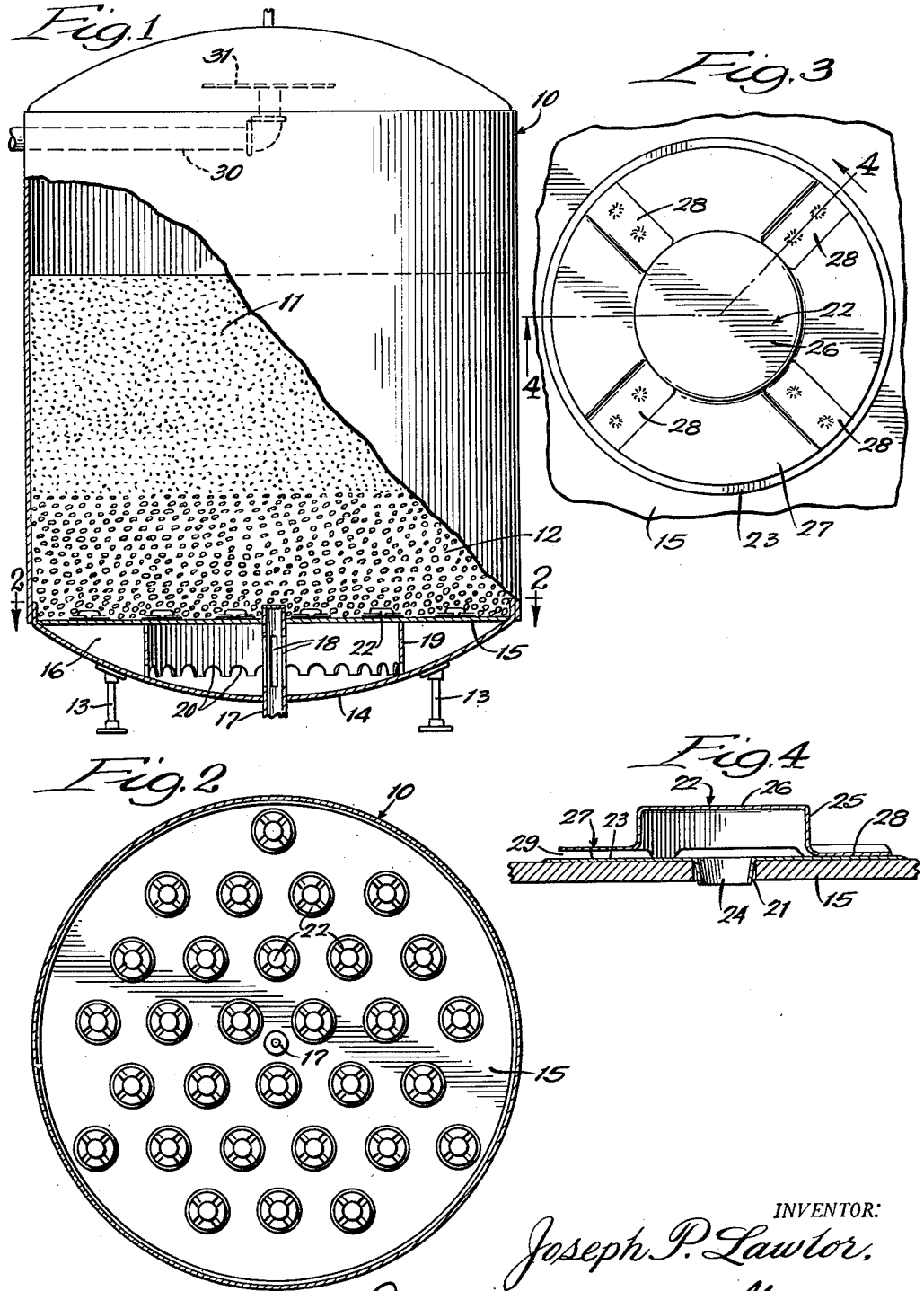

2,594,568

UNITED STATES PATENT OFFICE 2,594,568

FILTER UNDERDRAIN

Joseph P. Lawlor, Ames, Iowa

Application October 22, 1949, Serial No. 122,975

3 Claims. (Cl. 210—145)

This invention relates to a filter underdrain. More particularly, the invention relates to the underdrain system of a filter or water softener.

The underdrain system of a filter or softener has one principal function to accomplish and that is, to perform in such a manner as to encourage the uniform vertical flow of the water either upward or downward through the filter bed. The flow must be uniformly distributed throughout the entire bed. In the general practice heretofore employed and in order to bring about this uniform flow, it was common to install nozzles distributed at intervals of 4" to 8" throughout the entire horizontal area at the bottom of the filter. The openings in the nozzles are sufficiently small to create a loss of head when water is flowing through them. This loss of head, which is to be uniform in all nozzles, results in a fairly uniform distribution of the water flow in its path through the filter bed and supporting gravel. The supporting gravel itself also functions as a partial means of water distribution in that the lower portions of gravel are coarse and the layers immediately above are gradually finer.

In the above practice, however, it is found that a small amount of foreign matter often lodges in these nozzles when the filters are being backwashed and this results in unequal distribution of the back-wash water. That portion of the filter bed that does not receive its proper amount of back-wash water remains dirty and finally develops what is called "mud balls" and such mud balls work down through the filter bed. It then becomes impossible to produce a satisfactory treated water.

When the distribution points become clogged, this results in an excess vertical upflow through the unclogged areas. This excessive upflow rate, during back-wash periods, will often "upset" the supporting bed. Upsetting the supporting bed means that the graded granular material becomes mixed and creates large voids adjacent to the filter sand or zeolite. The result of this upset is that the filter sand or zeolite passes down through these large voids and is lost during the downflow or softening period.

In other practices where nozzles are secured to an underdrain plate, it is found that when the nozzle becomes clogged, this often results in a buckling of the underdrain plate into which the nozzles are secured. When the underdrain plate buckles, the filter is upset and the entire filtering material has to be removed and the underdrain system replaced or repaired.

An object of the present invention is to provide an underdrain structure which will overcome the clogging objection described above and the tendency of the underdrain plate to buckle, etc., while at the same time producing an excellent distribution of the back-wash and filtering water. Yet another object is to provide an underdrain plate and water distributing structure which creates a satisfactory head loss, thereby giving distribution throughout the horizontal area of the filter while at the same time preventing clogging, buckling of the plate or forming a corrosion or rust thereon. A still further object is to produce in combination with an underdrain plate a non-clogging nozzle which distributes the flow of water throughout the bottom of the filter bed and which because it is constructed of non-corrosive material avoids the possibility of corrosion or the gathering of rust around the nozzle port. A further object is to provide an underdrain plate and water distributing structure therewith which prevents the upsetting of the filter bed or excessive upflow rates during backwash periods. Other specific objects and advantages will appear as the specification proceeds.

The invention is illustrated in a single embodiment by the accompanying drawing, in which—

Fig. 1 is a side view in elevation and partly in section of filter apparatus equipped with structure embodying my invention; Fig. 2, a transverse sectional view, the section being taken as indicated at line 2—2 of Fig. 1; Fig. 3, an enlarged top plan view of an underdrain plate nozzle embodying my invention; and Fig. 4, a detailed sectional view, the section being taken as indicated at line 4—4 of Fig. 3.

In the illustration given, 10 designates a filter casing which may be of any suitable construction. The casing may be filled with any desired material for filtering or treating purposes. In the specific illustration given, 11 designates a filter media below which extend graded gravels as indicated by the numeral 12.

The casing 10 is supported upon standards 13 and is provided with a downwardly-dished bottom portion 14. An underdrain plate 15 extends across the casing above the dished portion 14 and provides a chamber 16 below the plate. A pipe 17 which may be employed as a drain pipe or as a means for introducing back-wash water, etc., extends through the bottom portion 14 of the casing and centrally through the plate 15. The pipe 17 is closed at its top but is provided with slots 18 which establish communication between the pipe and the chamber 16. If desired, a tubular support 19 may extend between the bottom 14 and the plate 15 and it may be provided with openings 20. It will be understood that the shape of the filter casing, the support thereof, and the means for introducing and distributing water in the chamber below the plate 15 may be varied widely to meet different uses and the demands of different processes.

The underdrain plate 15 is preferably provided with a number of spaced orifices or openings 21. Over each of the orifices is placed a baffle structure 22 and the structure is preferably secured to the plate 15 by welding or other suitable means. In the specific illustration given, the baffle structure 22 consists of two parts or plates. The lower plate 23 is provided with a downwardly-extending sleeve 24 which is received within the orifice 21 of plate 15. Over the plate 23 is a cap member 25 which is provided with a centrally-raised or crown portion 26 and with a laterally-extending skirt portion 27. The portion 26 may, if desired, be flat instead of being centrally raised. The skirt portion 27 is depressed at spaced intervals to make contact with the plate 23. At these points 28 where contact is made with the plate 23, I prefer to spot-weld or otherwise unite the plates. Between the depressed points 28, the skirt 27 extends outwardly at a spaced distance above the plate 23 therebelow to provide fan-shaped or sector passages 29 through which the water flows. The structure 22 is preferably formed of stainless steel or other non-corrosive material. The passage orifice areas 21 are computed so as to be of such a diameter that they will create a satisfactory head loss, thereby distributing the wash water to all portions of the filter bed at a uniform rate.

Water or other liquid may be introduced into the top of the casing 10 through a pipe 30 and if desired a distributor or variation plate 31 may be employed.

*Operation*

In the operation of the structure, assuming that water is to be filtered, the water is introduced through pipe 30 and the filter effluent is collected in chamber 16 and withdrawn through the slotted pipe 17. When back-wash water is introduced into the filter, the water enters through pipe 17, passes out through the slots 18 into chamber 16, and thence upwardly through the orifices 21 where the water is directed in a horizontal direction by baffles 22 so as to distribute the wash water uniformly throughout the lower portion of the filter bed. After the water passes through the passages 29, it flows horizontally, without appreciable restriction or head loss, until it reaches the coarse gravel of the filter bed where it gains further distribution. With this structure, each portion of the filter bed receives its proper proportion of back-wash water. This equal distribution makes it practically impossible to upset a filter-supporting bed and eliminates or greatly reduces the possibility of the formation of "mud balls." At the same time, clogging cannot occur because of the arcuate area of the fan-shaped passages. By extending the sleeve 24 downwardly through the steel-supporting plate or underdrain plate 15, there is avoided the possibility of corrosion or the gathering of rust around the orifice.

Back-wash water flowing through the orifice 21 is permitted to fill the distributing chamber within the crown 26 and thence flows out in equal portions through the raised channels or orifices 29 to distribute the wash water to all portions of the filter bed at a uniform rate.

While in the structure shown, the steel plate openings 21 are placed on centers of 10″ to 14″, thereby resulting in approximately 6″ between distribution edges of the non-clogging baffle or plate structure 22, it will be understood that these dimensions will be varied depending upon the size of the filter casing used and the type of treatment required.

The underdrain plate equipped with the orifice and baffles as described eliminates the disadvantages of the plate and nozzle and embedded nozzles heretofore employed in that there is no clogging in any stage of the filtering operation and particularly during back-washing; further, there is no tendency for the underdrain plate to buckle and no corrosion or rust is formed around the ports. In addition, the structure distributes the water uniformly through the filter bed and supporting gravel while maintaining the desired head loss.

While in the foregoing specification, I have set forth a specific structure in considerable detail for the purpose of illustrating one embodiment of the invention, it will be understood that such details may be varied widely by those skilled in the art without departing from the spirit of my invention.

I claim:

1. In a filter tank structure, an underdrain plate extending across the lower portion of the tank, said underdrain plate being provided with spaced openings therethrough, a baffle plate resting upon said underdrain plate over each of said openings and provided with an integral tapered sleeve extending freely through the opening therebelow and to a point below said underdrain plate, the walls of said sleeve tapering inwardly and downwardly as it extends through the opening, and an upper baffle plate having depressed portions secured to said lower plate and having raised portions between said depressed portions to provide laterally-extending discharge openings.

2. In a filter tank structure, an underdrain plate extending across the lower portion of the tank, said underdrain plate being provided with spaced openings therethrough, a baffle plate resting upon said underdrain plate over each of said openings and provided with an integral tapered sleeve extending freely through the opening therebelow and to a point below said underdrain plate, the walls of said sleeve tapering inwardly and downwardly as it extends through the opening, and an upper baffle plate having depressed portions secured to said lower plate and having raised portions between said depressed portions to provide laterally-extending discharge openings, the central portion of the second plate being raised to provide an enlarged central chamber above the flared upper portion of said sleeve and communicating therewith.

3. In a structure of the character set forth, an underdrain plate having a plurality of openings therethrough, a lower baffle plate extending over each of said openings and resting upon said underdrain plate, said baffle plate being provided centrally with an integral depending sleeve extending through and below the opening of said underdrain plate, said sleeve being tapered downwardly and inwardly with the narrowest part of the sleeve lying below said underdrain plate, and a second baffle plate above said lower baffle plate and having lateral depressed portions thereof secured to said lower plate and having raised portions between said depressed portions providing laterally-extending discharge openings, the central portion of the second plate being enlarged to form a dome-like chamber extending over and communicating with the upper flared inlet of said sleeve.

JOSEPH P. LAWLOR.

REFERENCES CITED

The following references are of record in the file of this patent:

UNITED STATES PATENTS

| Number | Name | Date |
|---|---|---|
| 395,625 | Moore | Jan. 1, 1889 |
| 707,333 | Hungerford | Aug. 19, 1902 |
| 1,668,205 | Hughes | May 1, 1928 |
| 1,747,470 | Duden | Feb. 18, 1930 |
| 1,828,282 | Dotterweich | Oct. 20, 1931 |
| 2,219,101 | Finwall | Oct. 22, 1940 |
| 2,360,958 | MacSorley | Oct. 24, 1944 |